(12) United States Patent
Dudar

(10) Patent No.: US 10,544,748 B2
(45) Date of Patent: Jan. 28, 2020

(54) SYSTEMS AND METHODS FOR WASTEGATE DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/873,626

(22) Filed: Jan. 17, 2018

(65) Prior Publication Data
US 2019/0218988 A1    Jul. 18, 2019

(51) Int. Cl.
| | | |
|---|---|---|
| *F02D 41/22* | (2006.01) | |
| *F02B 37/18* | (2006.01) | |
| *F02D 27/02* | (2006.01) | |
| *F02D 41/18* | (2006.01) | |
| *F02M 26/47* | (2016.01) | |
| *F02D 41/00* | (2006.01) | |

(52) U.S. Cl.
CPC ......... *F02D 41/221* (2013.01); *F02B 37/186* (2013.01); *F02D 27/02* (2013.01); *F02D 41/18* (2013.01); *F02D 41/0007* (2013.01); *F02D 2200/0406* (2013.01); *F02M 26/47* (2016.02)

(58) Field of Classification Search
CPC ...... F02B 37/18; F02B 37/183; F02B 37/186; F02D 23/00; F02D 23/02; F02D 41/0007; F02D 41/18; F02D 43/00; F02D 43/02; F02D 43/04; F02D 27/00; F02D 27/02; B60L 2710/30; B60W 20/50
USPC ...... 60/597, 598, 600–603, 605.1, 606, 608; 123/383, 528, 559.1, 562; 180/65.21–65.29
See application file for complete search history.

(56) References Cited

U.S. PATENT DOCUMENTS

| | | |
|---|---|---|
| 8,353,198 B2 | 1/2013 | Burkhardt et al. |
| 2002/0148224 A1 | 10/2002 | Propernick |
| 2017/0089286 A1* | 3/2017 | Deb ...................... F02D 41/221 |

* cited by examiner

*Primary Examiner* — Mark A Laurenzi
*Assistant Examiner* — Mickey H France
(74) *Attorney, Agent, or Firm* — Geoffrey Brumbaugh; McCoy Russell LLP

(57) ABSTRACT

Methods and systems are provided for diagnostics of a wastegate valve during vehicle-off conditions. In one example, the engine may be reverse rotated, unfueled, and air flow via the intake manifold may be estimated and compared to a baseline air flow. A stuck open wastegate valve may be indicated based on the comparison between the intake air flow and the baseline air flow.

18 Claims, 7 Drawing Sheets

SYSTEMS AND METHODS FOR WASTEGATE DIAGNOSTICS

FIELD

The present description relates generally to methods and systems for performing diagnostics of a wastegate valve coupled to a wastegate passage of an exhaust turbine.

BACKGROUND/SUMMARY

Certain internal combustion engines utilize a compression device such as a turbocharger to increase engine torque/power output density. In one example, a turbocharger may include a compressor and a turbine connected by a drive shaft, where the turbine is coupled to an exhaust manifold side and the compressor is coupled to an intake manifold side of an engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. A spring loaded wastegate valve may be controlled based on operating conditions to achieve the desired boost. The spring of the wastegate valve may be degraded over time causing the wastegate valve to be stuck in an at least partially open position. A partially stuck open wastegate valve may reduce boost pressure and adversely affect engine emissions.

One example approach for diagnosing wastegate valve operation is shown by Propernick in U.S. Patent Application No. 20020148224. Diagnostics of components of a turbocharger including a wastegate valve may be carried out during engine-off conditions. Pressurized air from a source may be delivered to the turbocharger and air pressure within the turbocharger may be estimated via a pressure gauge. Any leaks in the turbocharger system, including the wastegate valve may be detected under the applied pressure.

However, the inventors herein have recognized potential issues with such systems. As one example, additional components including an air supply source, conduits for air supply, and one or more pressure gauges may be required to carry out the diagnostics of the wastegate, thereby adding to costs and packaging concerns.

In one example, the issues described above may be addressed by an engine method comprising: testing for degradation of a wastegate valve, positioned in a wastegate passage which is coupled in parallel to a turbine positioned in an exhaust system of an engine, by routing airflow from the exhaust system through the wastegate valve into an intake of the engine and comparing the airflow in the intake to a baseline airflow through the wastegate valve into the engine intake. In this way, by routing ambient air through the wastegate valve during vehicle key-off conditions, it is possible to detect degradation of the wastegate valve.

In one example, a diagnostic routine of the wastegate valve may be opportunistically carried out during vehicle key-off conditions when the engine is not operated. The engine may be a boosted engine comprising a turbine driven intake air compressor and an electrically driven intake air compressor (herein also referred to as a battery operated electric booster) that is selectively operated for providing additional boost during increased torque demand. During a vehicle-off condition, the wastegate valve may be in a default closed condition. The engine may be reverse rotated, unfueled, and also the electric booster is reverse rotated to draw in ambient air from the tailpipe and route the air to the intake manifold via the exhaust turbine. The intake airflow may be estimated via a manifold airflow sensor and compared to a baseline airflow. Upon installation of the wastegate valve, the baseline air flow may be obtained by reverse rotating the engine, reverse rotating the electric booster, and estimating air flow through the intake manifold via the MAF sensor. The wastegate valve may be diagnosed to be stuck in at least a partially open position responsive to the intake airflow being higher than the baseline airflow. A degree of opening of the wastegate valve may be estimated based on a difference between the intake airflow and the baseline airflow, the degree of opening increasing with an increase in the difference between the intake airflow and the baseline airflow. Upon detection of degradation of the wastegate valve, during an immediately subsequent engine operation, the electric booster operation may be adjusted to account for the loss in boost pressure due to undesired exhaust flow via the degraded wastegate valve.

In this way, by opportunistically using existing engine components, such as an electric booster and a manifold air flow sensor, the need for additional sensors and/or equipment for diagnostics of a wastegate valve may be reduced or eliminated. By reverse rotating the engine, the drop in exhaust pressure may be utilized to draw in ambient air and carry out wastegate diagnostics. The technical effect of flowing air through the turbocharger during engine non-combusting condition is that it is possible to determine an amount of opening of the degraded wastegate valve based on the comparison between the intake airflow and the baseline airflow. By identifying degradation of the wastegate valve, suitable mitigating steps may be taken during subsequent engine cycles to improve engine performance. Overall, by regularly monitoring the health of the wastegate valve, fuel efficiency and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
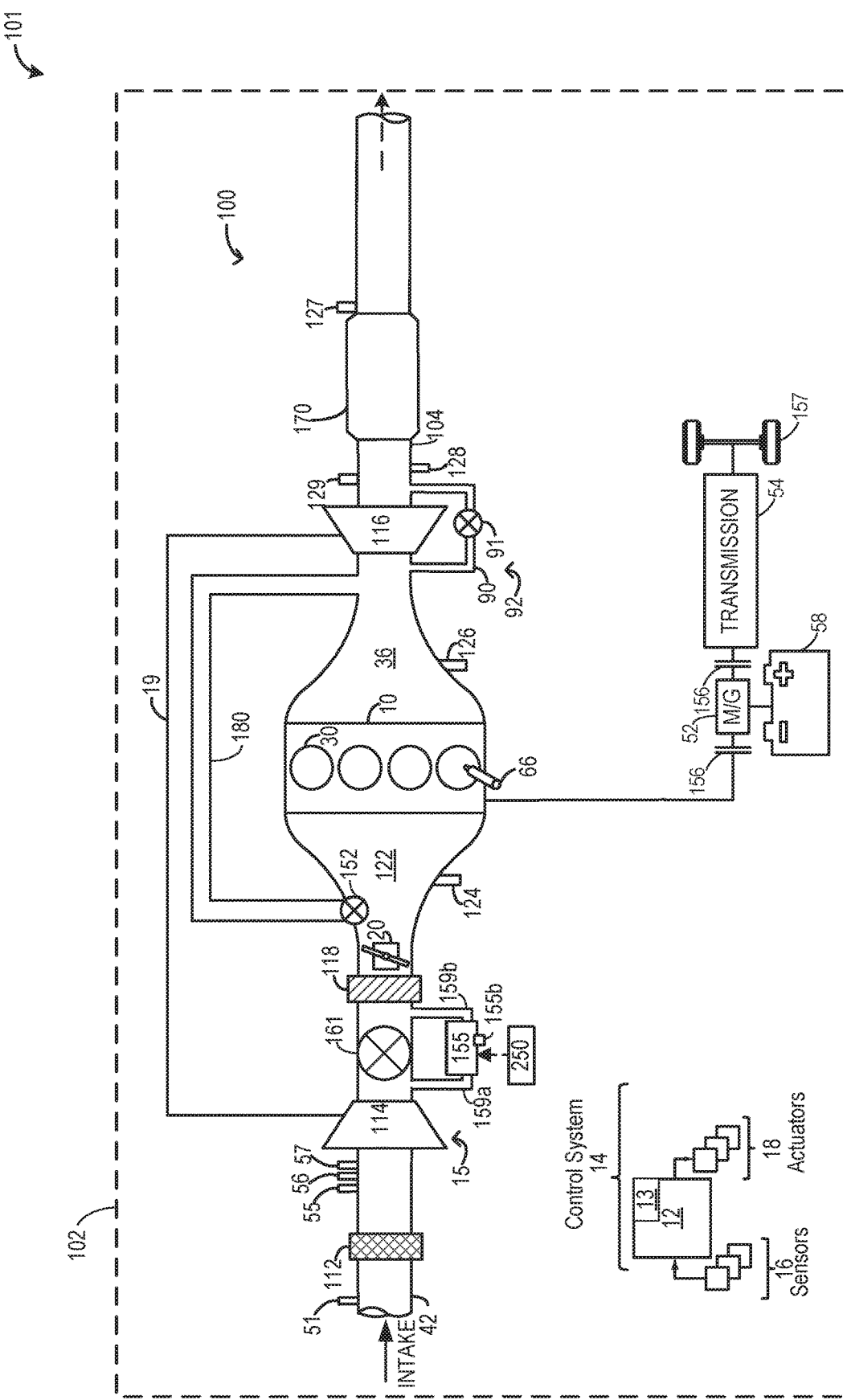
FIG. 1 schematically shows an example vehicle system including a turbocharger.
Figure 2:
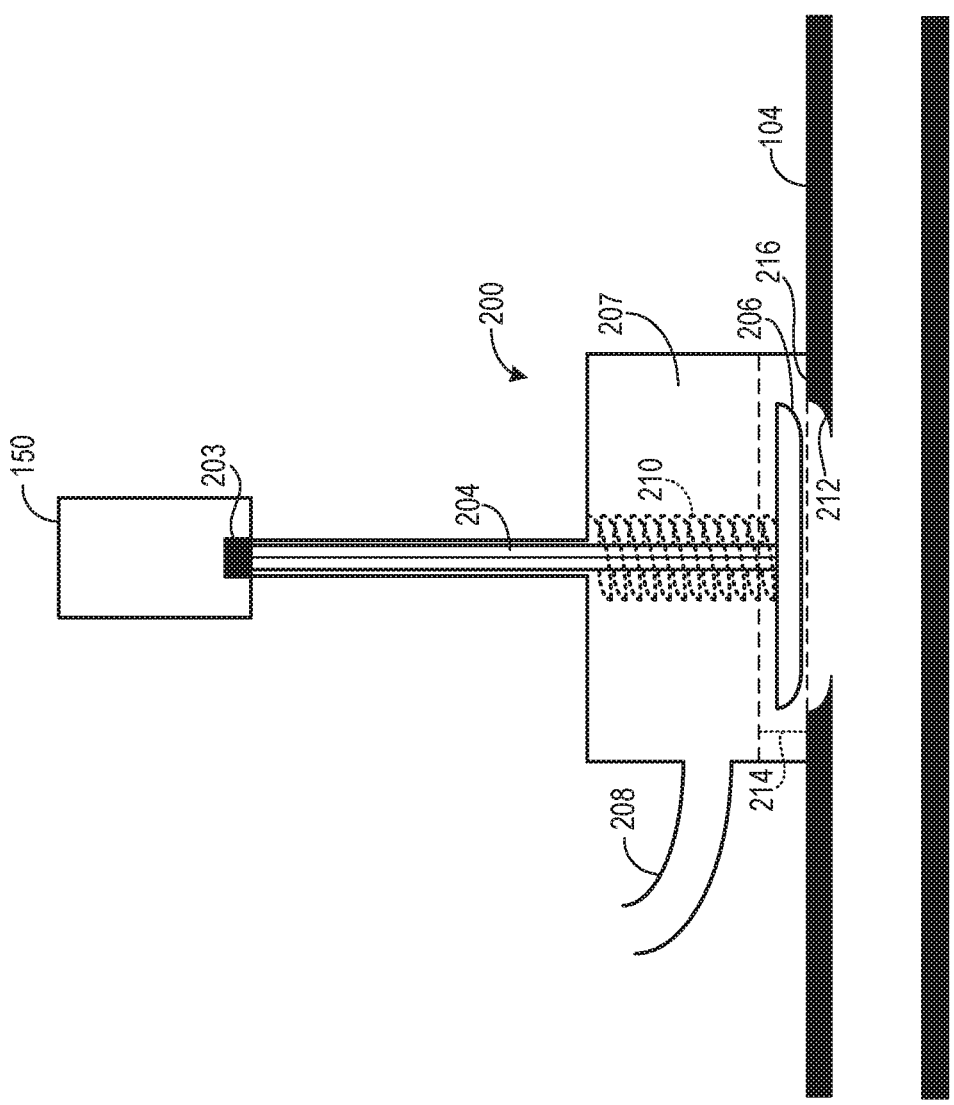
FIG. 2 shows an example of an electric wastegate in accordance with an embodiment of the present disclosure.
Figure 3:
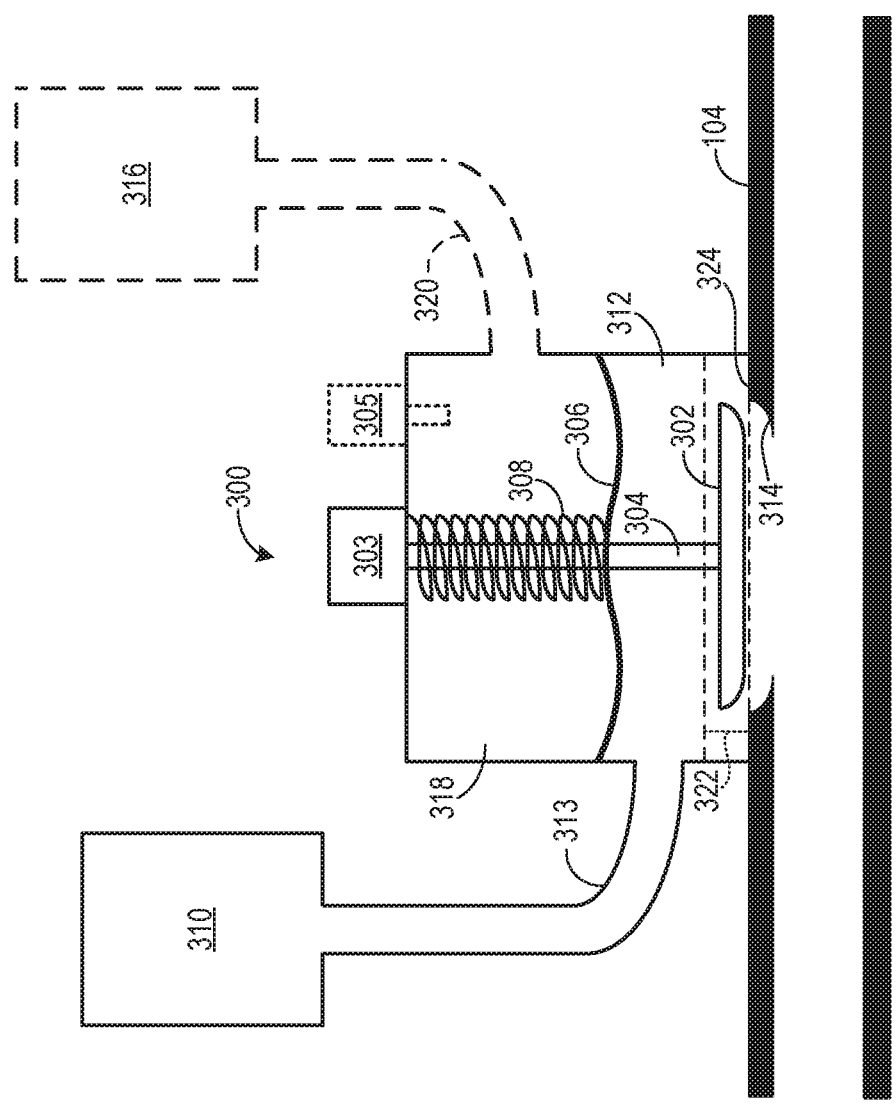
FIG. 3 shows an example of a pneumatic wastegate in accordance with an embodiment of the present disclosure.
Figure 4:
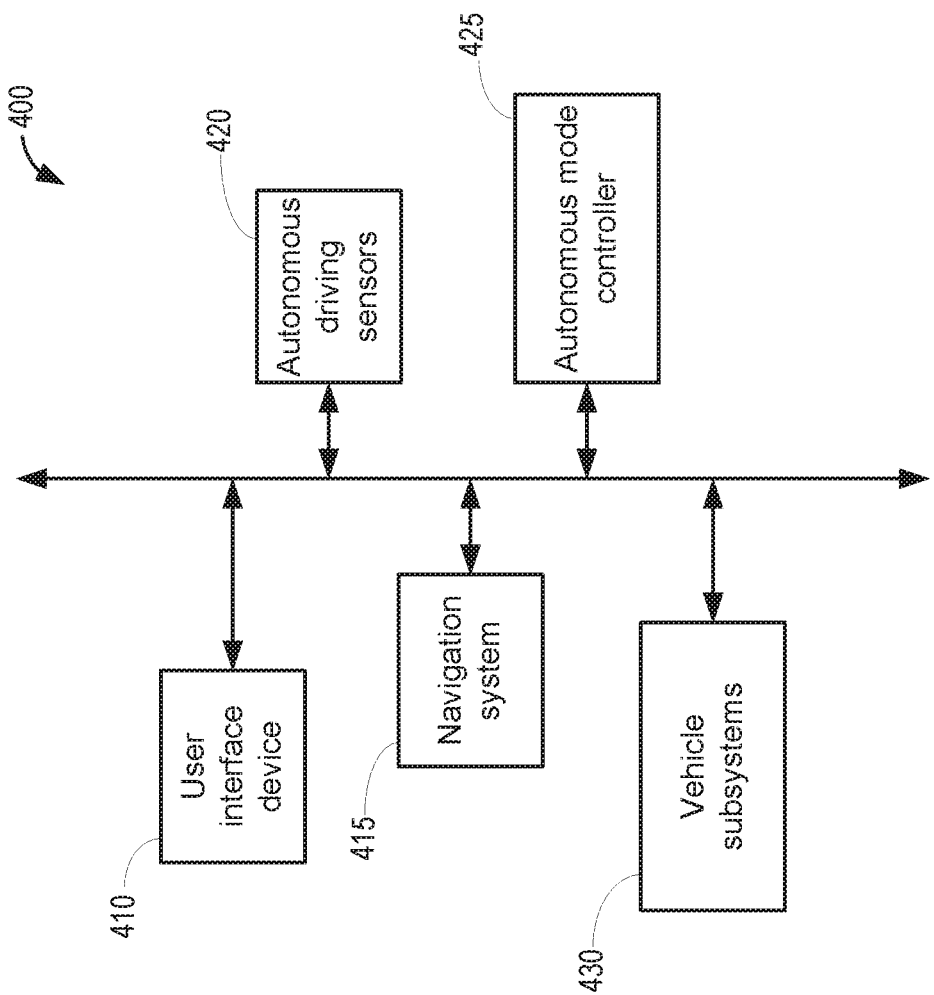
FIG. 4 schematically illustrates a block diagram of an example autonomous driving system.

The following description relates to systems and methods for diagnosing a wastegate coupled to an exhaust turbine, included in an example engine illustrated in FIG. 1. The wastegate may be an electric wastegate, as shown in FIG. 2, or a pneumatic wastegate, as shown in FIG. 3. Wastegate diagnostics may in some examples be carried out in an autonomous vehicle, where FIG. 4 depicts an example autonomous vehicle control system. During the diagnostics, for spinning the engine unfueled in the forward and reverse directions, an H-bridge circuit may be utilized, such as the H-bridge circuit depicted at FIGS. 5A-5B. During a vehicle key-off condition, an engine controller of the vehicle may be configured to perform an example routine to indicate degradation of a wastegate valve. In an example, a diagnostic routine illustrated in FIG. 6 may be performed. Example engine operations to enable wastegate diagnostics during a vehicle key-off condition are shown in FIG. 7.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 122. From the compressor, the compressed air charge flows through the charge-air cooler 118 and the throttle valve 20 to the intake manifold 122. In the embodiment shown in FIG. 1, the air flow through the intake manifold 122 is sensed by manifold air flow (MAF) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, the sensors may estimate a temperature, pressure, humidity, and air-fuel ratio of the air charge mixture including fresh air, recirculated compressed air, and exhaust residuals received at the compressor inlet.

To assist the turbocharger 15, an additional intake air compressor, herein also referred to as an electric booster 155 may be incorporated into the vehicle propulsion system. Electric booster 155 may be powered via an onboard energy storage device 250, which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device 250.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 122.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

A wastegate 92 may be coupled to the exhaust passage 104 to regulate the volume of exhaust flowing through the turbine. The wastegate passage may be coupled to the exhaust passage 104 from upstream of the turbine 116 to downstream of the turbine 116, the wastegate valve coupled to the wastegate passage 90 may regulate exhaust flow via the exhaust turbine 116. A wastegate valve (actuator) 91 may be actuated open to dump at least some exhaust pressure from upstream of the turbine to a location downstream of the turbine via wastegate passage 90. The wastegate valve 91 may be maintained in a default closed position to route the exhaust via the turbine 116. Based on boost demand, the controller may estimate a pressure set point for opening the wastegate valve 91. If the exhaust pressure upstream of the turbine increases to above the set point pressure, the wastegate valve 91 may open to route at least a portion of the exhaust from upstream of the turbine 116 to downstream of the turbine 116 via the wastegate passage 90 until the exhaust pressure reduces to below the set point. By reducing exhaust pressure upstream of the turbine, turbine speed can be reduced, which in turn helps to reduce compressor surge. FIGS. 2 and 3 show example embodiments of a wastegate 92.

As exhaust gas is routed through the wastegate passage 90, over time, soot and other carbon materials may build up in the wastegate system. As one example, the wastegate valve 91 may become loaded with carbon buildup, which may in some examples cause the wastegate valve 91 to exhibit degradation (e.g. stuck in at least a partially open position). A diagnostic routine for the wastegate valve 91 may be periodically or opportunistically carried out during a vehicle key-off condition. The engine may be reverse rotated, unfueled, via a motor and the electric booster 155 may also be reverse rotated to route ambient air from the exhaust system to the engine intake manifold 122 through the wastegate valve 91 and the turbine 116. The airflow in the intake manifold 122 may be estimated via a manifold air flow (MAF) sensor 124, and compared to a baseline airflow. The baseline airflow may be established via the MAF sensor 124 during a vehicle key-off condition, upon installation of the wastegate valve 91, by routing ambient air through the wastegate valve 91 while reverse rotating each of the engine and the electric booster 155. During a vehicle key-off condition, the wastegate valve 91 may be maintained in a default closed position and the entire volume of ambient air may flow from the exhaust passage 104 to the intake manifold 122 via the turbine 116. If the wastegate valve 91 is degraded and stuck in an open position, there may be an increase in airflow as a less restrictive flow path (compared to the turbine 116) is available for airflow. Degradation of the wastegate valve may be indicated responsive to the airflow in the intake manifold 122 being higher than the baseline airflow. It may be indicated that the wastegate valve 91 is not degraded responsive to the airflow in the intake manifold 122 being substantially equal to the baseline airflow (such as within 5% of the baseline airflow). In response to the indicating that the wastegate valve is degraded, a diagnostics code may be set, and during an immediately subsequent engine operation, operation of the electric booster 155 may be adjusted to compensate for degradation of the wastegate valve.

Intake manifold 122 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

A plurality of other sensors may also be coupled to EGR passage 180 for providing details regarding the composition and condition of the EGR. For example, a temperature sensor may be provided for determining a temperature of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor, an exhaust flow sensor, and exhaust pressure sensor 129 may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAF sensor 124, exhaust temperature sensor 128, exhaust pressure sensor 129, compressor inlet temperature sensor 55, compressor inlet pressure sensor 56, ambient humidity sensor 57, IAT sensor 51, engine coolant temperature sensor, and EGR sensor. Other sensors such as additional pressure, temperature, air/fuel ratio, and composition sensors may be coupled to various locations in engine system 100. In addition, sensors coupled to the exterior of the vehicle system such as the rain sensor (windshield sensor) 130 may be used to estimate ambient humidity.

The actuators 18 may include, for example, electric booster bypass valve 161, throttle 20, electric booster actuator 155b, EGR valve 152, wastegate valve 91, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, during a vehicle key-off condition, the controller 12 may send a signal to an electric motor and the electric booster actuator 155b to reverse rotate each of the engine and the electric booster 155, respectively, to flow ambient air via the turbine 116. The intake airflow is estimated via the MAF sensor 124 and the presence or absence of degradation of the wastegate valve 91 may be indicated based on a comparison between the intake air flow and a baseline air flow.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. For example, a wakeup capability may enable a circuit to wake the controller in order to opportunistically conduct diagnostics of the wastegate valve 91.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 54 to vehicle wheels 157 when one or more clutches 156 are engaged. In the depicted example, a first clutch 156 is provided between crankshaft and electric machine 52, and a second clutch 156 is provided between electric machine 52 and transmission 54. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 157. Electric machine 52 may also be operated as a generator to provide electrical power to charge traction battery 58, for example during a braking operation.

Turning now to FIG. 2, an example of a wastegate 200, which may be wastegate 92 of FIG. 1, is shown. Wastegate 200 is included along a portion of exhaust passage 104 shown in FIG. 1. In the illustrated embodiment, wastegate 200 is an electric wastegate and is driven by actuator 150, which in this example is a solenoid, though various suitable devices may be used to drive the wastegate. Actuator 150 transmits a driving force via a linkage 204 (e.g., a cylindrical rod) to a wastegate valve 206, which may transition between a fully closed position and a fully open position, and may settle at any position there between. The position of wastegate valve 206 may thus be continuously variable, and may be monitored via a position sensor 203 configured to send signals to an engine controller such as controller 12 of FIG. 1. It will be appreciated, however, that the state of wastegate valve 206 may be tracked in other manners, for example by other types of sensors or soft models.

As wastegate valve 206 is opened from the fully closed position, an opening may be created through which gasses flowing through exhaust passage 104 may flow into a chamber 207. From chamber 207, gasses may flow to a vent 208 which may receive and exhaust gas from exhaust passage 104 when wastegate valve 206 is not in the fully closed position. Thus, the amount of boost supplied to an engine may be controlled by driving wastegate valve 206 via actuator 150, thereby altering the position of wastegate valve 206 and the amount of gas reaching an intake manifold and a turbine of a turbocharger (e.g., turbine 116 in FIG. 1). In one example, the valve 206 may be formed via a pintle, with a surface area facing the flow through manifold 202. The pressure difference across the pintle may generate forces acting to move the pintle. Although not shown, wastegate 200 may include a motor and a gear box, with linkage 204 extending from an output shaft of the gear box to wastegate valve 206. In some embodiments position sensor 203 may measure the orientation of such components, such as the translational position of linkage 204, the rotational orientation of the output shaft or another component inside the motor. In this example, such measurements may be used to indirectly determine the position of wastegate valve 206. Moreover, in other embodiments the position of wastegate valve may be determined based on a soft model using one or more of the signals (e.g., BOOST) described above with reference to FIG. 1 and sent to controller 12.

Wastegate 200 may optionally include a bias 210. Bias 210 is attached at one end to wastegate 200 and to wastegate valve 206 at the other end. In some embodiments, bias 210 is selected to supply a closing force which maintains wastegate valve 206 in a fully closed position up to a threshold pressure. As one non-limiting example, bias 210 may be selected to allow wastegate valve 206 to open for a mean pressure difference across the turbocharger turbine between 0.75 bar and 1 bar. In the event of wastegate degradation, for example due to a loss of power to actuator 150, wastegate valve 206 may be maintained in a fully closed position up to a threshold pressure via the spring pre-load, ensuring that a sufficient buildup of boost is delivered to the engine. Such a configuration may be particularly advantageous in downsized engines, as the extent of downsizing need not be limited to account for the possibility of wastegate actuator degradation. Conversely, at or above the threshold pressure, bias 210 may allow wastegate valve 206 to move toward a fully open position, limiting maximum boost, especially at high loads. Moreover, the size of a wastegate actuator (e.g., actuator 150) and its power consumption may be reduced, as bias 210 supplies additional closing force to wastegate 26. Therefore, during non-degraded operation, the actuator may hold the valve in the fully closed position with a current level that is lower than if the spring pre-load was zero. The current supplied to actuator 150 may be selected to account for the closing force of a bias, such as the spring. In the illustrated embodiment, bias 210 is shown as a spring in a pre-compressed state, though various suitable structures may be used to supply additional closing force to wastegate 200. In the case where a spring is employed, the spring constant may be selected to supply closing force up to a particular threshold pressure and supply sufficient boost to an engine.

At the fully closed position, wastegate valve 206 comes into contact with a valve seat 212, abutting the valve seat and fluidically sealing wastegate 200 from exhaust passage 104 such that gasses flowing through the exhaust passage do not enter the wastegate. At this position, maximum boost may be provided to engine 10, depending on other conditions such as the position of throttle 20 of FIG. 1. FIG. 2 also depicts a low-lift region 214 designating a region in which the separation between wastegate valve 206 and valve seat 212 is considered to be relatively small for the plurality of positions (e.g., lifts) of the wastegate valve in this low-lift region. As used herein, "lift" may equally refer to the separation of a wastegate valve from a corresponding valve seat. Low-lift region 214 may extend from an upper surface 216 of valve seat 212 to any suitably defined point within chamber 207, and may be measured from this upper surface to the upper surface of wastegate valve 206. For example, low-lift region 214 may extend from upper surface 216 of valve seat 212 to a height approximately 20% of the total height of chamber 207. It will be understood, however, that suitable low-lift regions may be predetermined based on the physical characteristics of a wastegate or dynamically determined based on various operating parameters.

Turning now to FIG. 3, another example of a wastegate 300 is shown, which may be wastegate 92 of FIG. 1. As with electric wastegate 200 shown in FIG. 2, wastegate 300 is included along a portion of exhaust passage 104 shown in FIG. 1, and includes a wastegate valve 302 coupled to a linkage 304 (e.g., cylindrical rod). Wastegate 300, however, is a pneumatic wastegate controlled via pressurized fluid. As such, linkage 304 is coupled to a diaphragm 306 which is in turn coupled to a bias 308, which may be bias 210 of FIG. 2 or any other suitable bias. Bias 308 may bias wastegate valve 302 and diaphragm 306 to any suitable position—e.g., at a fully closed position, a fully open position, or anywhere there between. A position sensor 303 tracks the position of wastegate valve 302, relaying the tracked position to an engine controller such as controller 12 of FIG. 1. Alternatively or additionally, wastegate 300 may include a pressure sensor 305 to facilitate tracking of the state of the wastegate.

To facilitate pneumatic positioning of wastegate valve 302, a pressurized fluid source 310 provides varying levels of pressurized fluid (e.g., pressurized air) to a first chamber 312 of wastegate 300 via a first duct 313. Pressurized fluid entering first chamber 312 acts against diaphragm 306, adjusting the position of diaphragm 306 and thus wastegate valve 302 with sufficient pressures. When wastegate valve 302 is in a fully closed position (e.g., fully abutted against a valve seat 314 and fluidically sealing gasses flowing through exhaust passage 104 from first chamber 312), pressurized fluid delivered from pressurized fluid source 310 to the first chamber provides the mechanism by which wastegate valve 302 may begin to open. At other partially open positions, however, pressurized fluid delivered from pressurized fluid source 310 may combine with exhaust gasses entering first chamber 312 from exhaust passage 104 to position wastegate valve 302. Pressurized fluid source 310 may be, for example, an air compressor or a source of intake air from engine 10 of FIG. 1. Although not shown, pressurized fluid source 310 may include a vacuum regulator and/or one or more valves to control the supply of pressurized fluid to first chamber 312. Likewise, wastegate 300 may optionally include a second pressurized fluid source 316 configured to provide pressurized fluid (e.g., pressurized air) to a second chamber 318 in wastegate 300 via a second duct 320. Pressurized fluid delivered from this source to second chamber 318 may act against diaphragm 306 in a direction opposite that of fluid delivered to first chamber 312. With the inclusion of a vacuum regulator and/or one or more valves in second pressurized fluid source 316 and/or second duct 320, precise positioning of wastegate valve 302 may be achieved via balanced supply of pressurized fluid to both first and second chambers 312 and 318. It will be appreciated that suitable modifications may be made to wastegate 300 without departing from the scope of the disclosure. For example, a vent (not shown) may be provided to further aid in pressure regulation in the wastegate.

FIG. 3 also shows a low-lift region 322 in which the separation between wastegate valve 302 and valve seat 314 is considered to be relatively small for the plurality of positions (e.g., lifts) of the wastegate valve in this low-lift region. As with low-lift region 214 shown in FIG. 2, low-lift region 322 may extend from an upper surface 324 of valve seat 314 to any suitably defined point within first chamber 312, and may be measured from this upper surface to the upper surface of wastegate valve 302. As a non-limiting example, low-lift region 322 may extend from upper surface 324 of valve seat 314 to a height approximately 15% of the sum height of first and second chambers 312 and 318. Low-lift region 322 may be defined as any suitable portion of the sum height of first and second chambers 312 and 318, and may be predetermined based on the physical characteristics of wastegate 300 or determined dynamically based on various desired operating parameters.

Diagnostic routines for the wastegate valve 91 may be conducted in a vehicle configured as an autonomous vehicle and an example autonomous driving system is discussed below with regard to FIG. 4. FIG. 4 is a block diagram of an example autonomous driving system 400 that may operate the vehicle 102, described above at FIG. 1. The autonomous driving system 400, as shown, includes a user interface device 410, a navigation system 415, at least one autonomous driving sensor 420, and an autonomous mode controller 425.

The user interface device 410 may be configured to present information to vehicle occupants, under conditions wherein a vehicle occupant may be present. However, it may be understood that the vehicle may be operated autonomously in the absence of vehicle occupants, under certain conditions.

The presented information may include audible information or visual information. Moreover, the user interface device 410 may be configured to receive user inputs. Thus, the user interface device 410 may be located in the passenger compartment (not shown) of the vehicle. In some possible approaches, the user interface device 410 may include a touch-sensitive display screen.

The navigation system 415 may be configured to determine a current location of the vehicle using, for example, a Global Positioning System (GPS) receiver configured to triangulate the position of the vehicle relative to satellites or terrestrial based transmitter towers. The navigation system 415 may be further configured to develop routes from the current location to a selected destination, as well as display a map and present driving directions to the selected destination via, for example, the user interface device 410.

The autonomous driving sensors 420 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 420 may enable the vehicle to "see" the roadway and vehicle surroundings, and/or negotiate various obstacles while the vehicle 102 is operating in autonomous mode. The autonomous driving sensors 420 may be configured to output sensor signals to, for example, the autonomous mode controller 425.

The autonomous mode controller 425 may be configured to control one or more subsystems 430 while the vehicle is operating in the autonomous mode. Examples of subsystems 430 that may be controlled by the autonomous mode controller 425 may include a brake subsystem, a suspension subsystem, a steering subsystem, and a powertrain subsystem. The autonomous mode controller 425 may control any one or more of these subsystems 430 by outputting signals to control units associated with subsystems 430. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 425 may output appropriate commands to the subsystems 430. The commands may cause the subsystems to operate in accordance with the driving characteristics associated with the selected driving mode. For example, driving characteristics may include how aggressively the vehicle accelerates and decelerates, how much the vehicle space leaves behind a front vehicle, how frequently the autonomous vehicle changes lanes, etc.

Figure 5A:
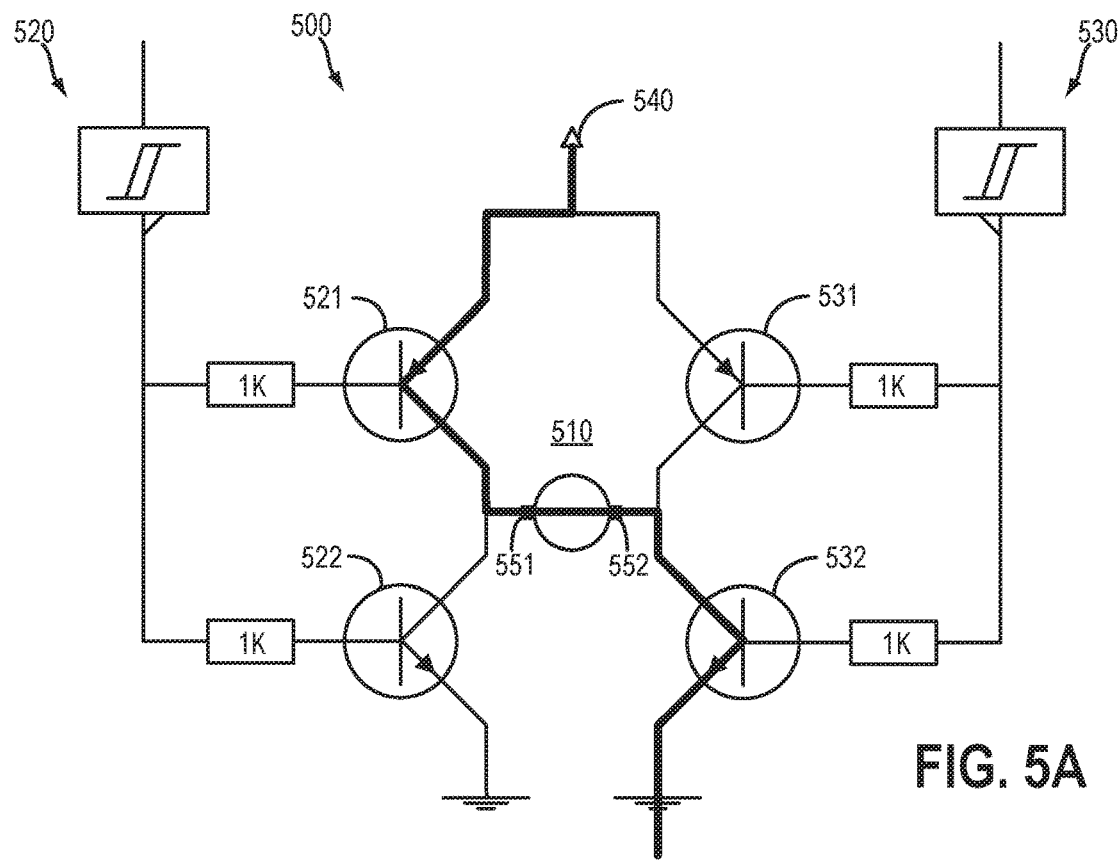
FIGS. 5A and 5B schematically show an example H-bridge circuit which may be used to rotate a vehicle engine in a forward or reverse direction.
Figure 5B:
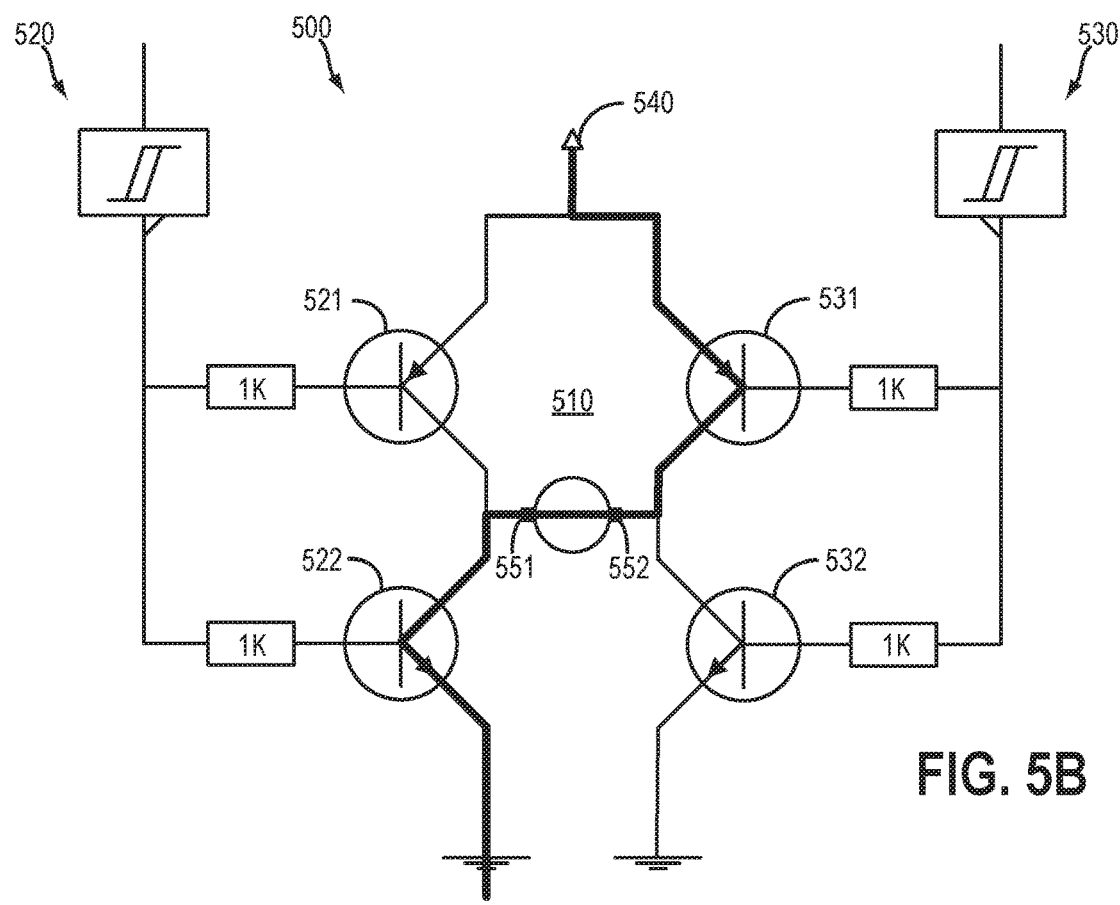

FIGS. 5A and 5B show an example circuit 500 that may be used for reversing a spin orientation of an electric motor. Circuit 500 schematically depicts an H-Bridge circuit that may be used to run a motor 510 in a first (forward) direction and alternately in a second (reverse) direction. The H-bridge circuit may be opportunistically used to spin an engine (such as engine 10 in FIG. 1), unfueled, in a forward or a reverse direction via the electric motor. Circuit 500 comprises a first (LO) side 520 and a second (HI) side 530. Side 520 includes transistors 521 and 522, while side 530 includes transistors 531 and 532. Circuit 500 further includes a power source 540.

In FIG. 5A, transistors 521 and 532 are activated (energized), while transistors 522 and 531 are off. In this configuration, the left lead 551 of motor 510 is connected to power source 540, and the right lead 552 of motor 510 is connected to ground. In this way, motor 500 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 5B, transistors 522 and 531 are activated (energized), while transistors 521 and 532 are off. In this configuration, the right lead 552 of motor 510 is connected to power source 540, and the left lead 551 of motor 510 is connected to ground. In this way, motor 510 may run in a reverse direction.

In this way, the components of FIGS. 1-5B enable a system comprising: a vehicle, including an autonomous vehicle and/or a hybrid vehicle, an electric machine, an engine including an intake passage and an exhaust passage, an intake throttle coupled to the intake passage, a turbocharger including an intake compressor coupled to the intake passage and an exhaust turbine coupled to the exhaust passage, a wastegate passage coupled to the exhaust passage across the exhaust turbine, a wastegate valve coupled to the wastegate passage, a manifold air flow (MAF) sensor coupled to the intake passage, a conduit coupled to the intake passage downstream of the intake compressor and upstream of a charge air cooler, the conduit including a motor-driven electric booster, and a controller with computer readable instructions stored on non-transitory memory for: obtaining a baseline airflow via the MAF sensor by reverse rotating the engine with the electric machine when the wastegate valve is first installed, and after usage of the wastegate valve for a threshold duration since the wastegate valve is installed and while the engine is rotated in reverse by the electric machine, obtaining a first intake air flow via the MAF sensor, and responsive to the first intake air flow being higher than the baseline airflow, indicating degradation of the wastegate valve.

Figure 6:
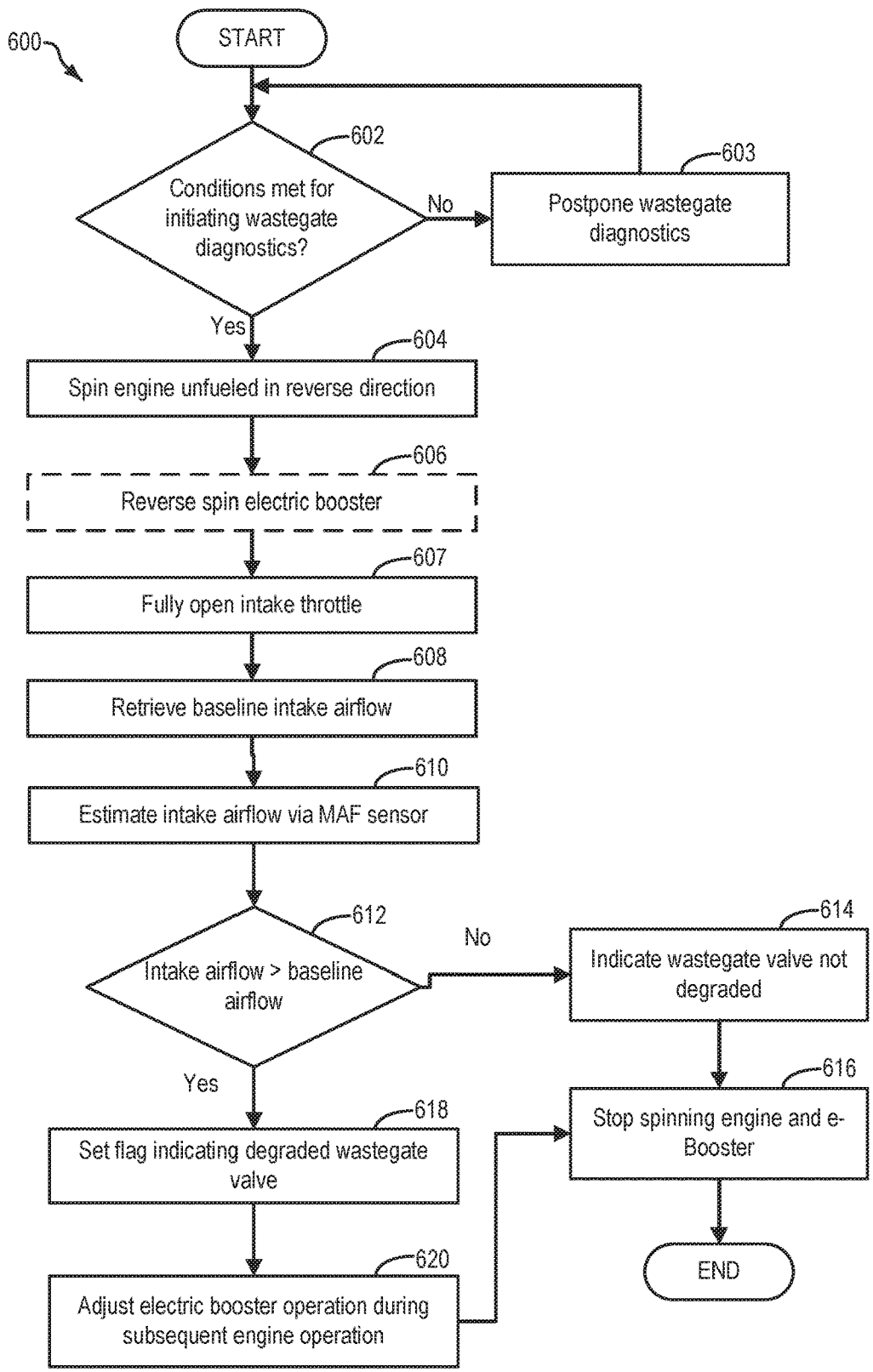
FIG. 6 shows a flow chart illustrating a diagnostic routine for diagnosing a degraded wastegate valve.
Figure 7:
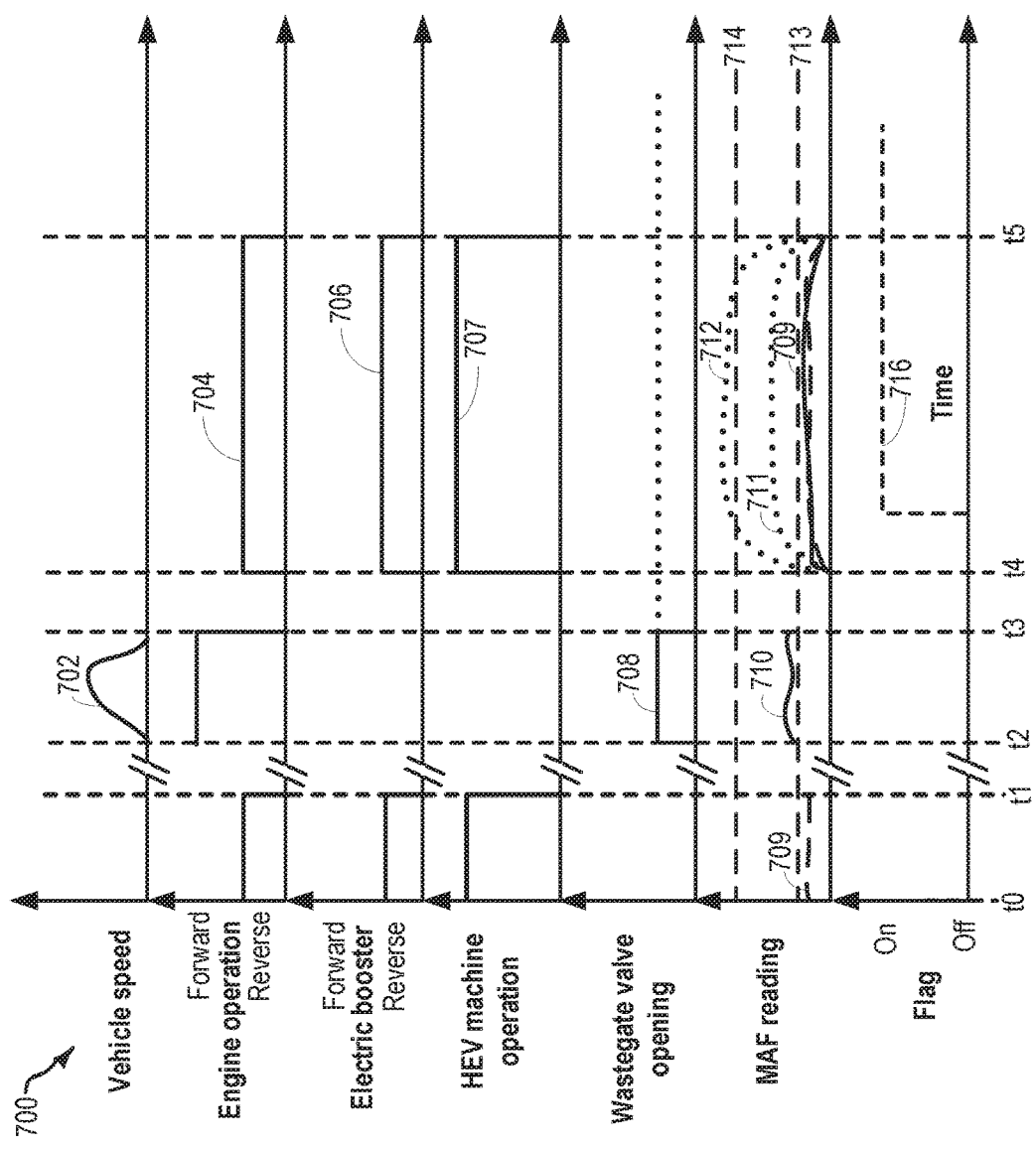
FIG. 7 shows an example diagnosis of a wastegate valve during an engine-off condition, according to the present disclosure.

FIG. 6 shows an example method 600 that may be implemented to carry out diagnostics of a wastegate valve during an engine non-combusting condition. Instructions for carrying out method 600 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 602, the method includes determining if conditions are met for initiating wastegate valve (such as wastegate valve 91 in FIG. 1) diagnostics. In one example, conditions for initiating wastegate valve diagnostics may include a vehicle-off condition when the vehicle is unoccupied (any passenger is not present in the vehicle). Seat load cells, onboard camera(s), and/or door sensing technology may be utilized to ensure that the vehicle is not occupied. In another example, the wastegate valve diagnostics may be carried out during an autonomous vehicle mode when the vehicle is operated without a human driver and when the vehicle is not being propelled by engine torque. The vehicle operation may be controlled from a remote location or may be pre-programmed in the controller memory. During vehicle operation in the autonomous mode, the diagnostics may be opportunistically carried out when the vehicle is stopped at a traffic signal or immediately upon completion of a drive cycle. In yet another example, the wastegate valve diagnostics may be carried out responsive to a wakeup of the controller after a predetermined duration after a key-off event. Conditions for initiating diagnostics of the exhaust tuning valve includes confirmation that the engine sensors such as the MAF sensor, the oxygen sensors, etc. are not degraded and in general there any no diagnostic codes (flags) set indicating degradation of any engine component. Further, prior to initiating the wastegate valve diagnostics, the controller may verify if a predetermined duration of time has elapsed since a prior wastegate valve diagnostic routine was carried out. In some examples, such a predetermined duration of time may comprise one day, greater than one day but less than two days, greater than two days, etc. In other examples, the predetermined duration may include a number of miles driven, number of hours of vehicle operation, or other parameter.

If it is determined that the conditions for initiating the wastegate valve diagnostics are not met, at 503, the wastegate valve diagnostic routine may be postponed until the conditions are being met. In some examples, if the wastegate valve diagnostic conditions are not met, current operating parameters may be continued until the wastegate valve diagnostic conditions are met. Such operating parameters may include, if the vehicle is operating, fuel being delivered to one or more engine cylinders via fuel injectors of the fuel system and combustion of air and fuel being carried out in the cylinders. Engine torque produced by combustion in the engine cylinders may be used to propel the vehicle. Based on the boost pressure and engine operating conditions, the controller may estimate a pressure set point above which the wastegate valve may open to flow a portion of exhaust via the wastegate passage (such as wastegate passage 90 in FIG. 1), bypassing the exhaust turbine (such as exhaust turbine 116 in FIG. 1). In one example, the controller may use a look-up table to determine the set point pressure of wastegate valve. Torque demand and exhaust pressure may be used as inputs to the look-up table and the set point pressure may be the output of the table. If the exhaust pressure upstream of the turbine is lower than the set point pressure, the wastegate valve may be maintained in a default closed condition and the entire volume of exhaust may be routed through the turbine to provide the desired boost pressure.

An electric booster (such as electric booster 155 in FIG. 2) may be coupled to a conduit parallel to an intake passage, and during conditions when the boost pressure provided by operating the turbocharger (such as intake compressor 114 and exhaust turbine 116 in FIG. 2) is lower than a desired boost pressure, the electric booster may be operated using energy from an onboard energy storage device to provide the desired boost.

If it is determined that conditions for initiating the wastegate valve diagnostics are met, at 604, the routine includes rotating or spinning the engine unfueled at a predetermined speed (e.g., predetermined RPM), in the reverse direction. Rotating the engine in the reverse direction may comprise rotating the engine in the opposite direction as when the engine is operated to combust air and fuel. Rotating the engine unfueled in the reverse direction may create a lower pressure in the exhaust passage and cause ambient air to flow through the exhaust system, the engine, and the intake manifold, in that order. Rotating the engine unfueled in the reverse direction may comprise rotating the engine via a motor (such as electric machine 52 in FIG. 1), where the motor may be powered via the onboard battery (such as battery 58 in FIG. 1). In a non-hybrid vehicle, the engine may be reverse rotated via a starter motor and a battery of the vehicle. To rotate the engine in reverse, an H-bridge circuit, such as that depicted at FIGS. 5A-5B, may be utilized. The speed of the engine may be controlled via the motor, to the predetermined speed. The predetermined engine speed may comprise a speed at which robust measurements of air flow may be obtained via the MAF sensor (such as MAF sensor 124 in FIG. 1) while the engine is being spun in reverse. In one example, the predetermined speed may be lower than 500 rpm.

At 606, an electric booster (such as electric booster 155 in FIG. 1) may be rotated in a reverse direction. During conditions when the boost pressure provided by operating the turbocharger is lower than a desired boost pressure, the electric booster may be operated in a forward, default direction, to provide the desired boost. Reverse rotation of the electric booster creates a lower pressure at the intake manifold relative to the pressure at the exhaust manifold, thereby facilitating air flow from the exhaust system to the intake manifold. The controller may send a signal to the electric booster actuator (such as actuator 155b in FIG. 1) to actuate the electric booster using energy from the energy storage device (such as energy storage device 250 in FIG. 1) coupled to the electric booster. The speed of rotation of the electric booster during the diagnostic routine may be lower than the speed of rotation of the electric booster when operated to compensate for the lag of the mechanical turbocharger. In one example, the speed of rotation of the electric booster during the diagnostics routine may be 2500 RPM. By operating the electric booster at a lower speed, power consumption may be reduced and noise generation during operation of the electric booster may also be reduced. By simultaneously reverse rotating the engine and the electric booster, the speed of rotation of the engine during the wastegate diagnostics may be lower than the engine idling speed. By rotating the engine at a lower than idling speed, power consumption by the electric machine may be reduced.

In one example, step 606 of method 600 may be optional and diagnostics of the wastegate valve may be carried out without spinning the electric booster. The electric booster may be maintained in a deactivated condition while the engine is reverse rotated during the wastegate valve diagnostic routine. In another example, the electric booster may be reverse rotated during the wastegate valve diagnostics without reverse rotation of the engine. The engine may be maintained in a deactivated condition while the electric booster may be reverse rotated to flow ambient air from the exhaust manifold to the intake manifold. In yet another example, each of the engine and the electric booster may be reverse rotated until a threshold non-zero airflow is achieved and then the electric booster may be deactivated to reduce energy usage.

At 607, the controller may send a signal to the throttle (such as throttle valve 20 in FIG. 1) coupled to the engine intake to actuate the throttle to a fully open position. As the engine and the electric booster are rotated in their respective reverse directions, a lower pressure is created at the engine exhaust manifold and ambient air may enter the engine system via the exhaust passage. As the throttle is opened to a wide open position, a higher portion of ambient may enter the engine via the exhaust passage and may flow to the engine intake via the turbine and the wastegate passage. The ambient air may then be released to the atmosphere via the intake throttle.

At 608, a baseline intake airflow may be retrieved from database in the controller memory. In one example, the baseline airflow may be estimated during a vehicle key-off condition, via the MAF sensor upon installation of the wastegate valve by cranking the engine unfueled in the reverse direction and rotating the electric booster in the reverse direction. In one example, installation of the wastegate valve may include fitting the wastegate valve in the engine at a manufacturing facility. In another example, installation of the wastegate valve may include replacement of an older wastegate valve with a new wastegate valve at a service location. The baseline airflow may be estimated within a first threshold duration since installation of the wastegate valve while the diagnostics of the wastegate valve may be carried out when the wastegate valve has been in use for over a second threshold duration, the second threshold duration being longer than the first threshold duration. In one example, the first threshold duration may be one day since the installation of the wastegate valve. In another example, the second threshold duration may be 30 days since the installation of the wastegate valve. Alternatively, the baseline airflow may be estimated within a first threshold distance of travel (of the vehicle) since installation of the wastegate valve while the diagnostics of the wastegate valve may be carried out when the wastegate valve has been in use for over a second threshold distance of travel, the second threshold distance being longer than the first threshold distance. In one example, the first threshold distance may be 30 miles since the installation of the air filter. In another example, the second threshold distance may be 300 miles since the installation of the air filter.

The baseline airflow may be obtained while operating the engine and the electric booster at the predetermined set of conditions including an engine speed, a duration of engine cranking, an open intake throttle position, and a speed of rotation of the electric booster. As an example, the predetermined set of conditions at which the baseline air flow is estimated is same as the predetermined set of conditions at which the engine is spun in step 604 and the electric booster is rotated in step 606.

When the baseline airflow is estimated during a vehicle key-off condition, the newly installed wastegate valve may be in the default closed condition causing the ambient air to flow from the exhaust passage to the intake manifold through the exhaust turbine. The turbine may provide a restrictive path for airflow, thereby causing a lower amount of air to flow through the engine components (from exhaust passage to intake manifold) compared to an amount of air that would have passed through the engine components if the wastegate valve was open.

At 610, the method proceeds with the diagnostic routine for the wastegate valve and estimates air flow through the intake manifold via the MAF sensor (intake airflow). As the wastegate valve is maintained in a default closed position during engine non-combusting conditions, ambient air may flow from the exhaust passage to the intake manifold via the exhaust turbine.

At 612, the routine includes determining if the intake airflow is higher than the baseline airflow. In one example, it may be determined if the intake airflow is more than 5% higher than the baseline airflow. If it is determined that the intake airflow is not higher than the baseline airflow, at 614, it may be inferred that the intake airflow is substantially equal to the baseline airflow (such as with 5% of the baseline airflow) and air flows from the exhaust passage to the intake manifold though the restrictive path including the exhaust turbine (not through the wastegate passage). At 614, it may be indicated that the wastegate valve is not degraded.

If it is determined that the intake airflow is higher than the baseline airflow, it may be inferred that at least a portion of the ambient air entering the exhaust passage may flow from the exhaust passage to the intake manifold via the wastegate passage. Compared to the exhaust turbine, the wastegate passage provides a flow path with lower resistance, thereby causing a higher amount of air to flow from the exhaust passage to the intake manifold. Therefore, there is an increase in the estimated intake airflow. Since the wastegate valve is expected to be maintained in the default closed position during the diagnostic routine, based on the air flow through the wastegate passage it may be inferred that the wastegate valve is stuck in an at least partially open position. In one example, carbon particles from the exhaust stream may build up in the wastegate valve causing the valve to be stuck in a partially open position. At 618, a diagnostic code (flag) may be set indicating blockage or degradation of the wastegate valve. In one example, the degree of opening of the wastegate valve may be estimated based on the difference between the intake airflow and the baseline airflow. As such, the difference between the intake airflow and the baseline airflow may increase with an increase in the degree of opening of the wastegate valve. The controller may use a look-up table to determine the degree of opening of the wastegate valve based on the difference between the intake airflow and the baseline airflow. The difference between the intake airflow and the baseline airflow may be used as an input of the look-up table and the degree of opening of the wastegate valve may be the output of the table.

Since the wastegate valve is degraded, during subsequent engine operations, a higher than desired amount of exhaust may flow through the wastegate passage, bypassing the exhaust turbine. Due to the lower amount of exhaust flowing through the turbine, the turbine speed may not increase to the desired level. Therefore, at 620, during subsequent engine operation, speed of operation of the electric booster may be adjusted to compensate for degradation of the wastegate valve. In one example, a speed of rotation of the electric booster may be increased in response to the degradation of the wastegate valve. The controller may estimate the speed of rotation of the electric booster based on the torque demand and the degree of opening of the wastegate valve. In one example, the speed of rotation of the electric booster may be increased with an increase in each of the torque demand and the degree of opening of the wastegate valve. The controller may use a look-up table to determine the speed of operation of the electric booster. Each of the torque demand and the degree of opening of the wastegate valve may be used as an input of the look-up table and the speed of rotation of the electric booster may be used as the output of the table.

At 616, the diagnostic routine is completed and each of the engine and the electric booster may no longer be rotated. The controller may send a signal to the motor powering the engine to stop rotating the engine. The controller may also send a signal to the actuator coupled to the electric booster to suspend operation of the electric booster and the vehicle may return to the key-off condition.

In this way, during a first engine condition, an engine may be reverse rotated to route ambient air through one or more of an exhaust turbine positioned in an exhaust of the engine and a wastegate valve positioned in a wastegate passage bypassing the exhaust turbine, and a baseline intake airflow may be recorded, during a second engine condition, the engine may be reverse rotated to route ambient air through one or more of the exhaust turbine and the wastegate valve, and recording an updated intake airflow may be recorded, and it may be indicated that the wastegate valve is stuck in an open position in response to the updated intake airflow being higher than the baseline intake airflow. As an example, the first engine condition may include an engine condition when a lower than first threshold duration has elapsed since installation of the wastegate valve, and the second engine condition may include a used engine condition when the wastegate valve has been in use for over a second threshold duration, the second threshold duration longer than the first threshold duration.

FIG. 7 shows an example timeline 700 illustrating diagnostics of a wastegate valve (such as wastegate valve 91 in FIG. 1) coupled to a wastegate passage (such as wastegate passage 90 in FIG. 1) bypassing an exhaust turbine. The horizontal (x-axis) denotes time and the vertical markers t0-t5 identify significant times in the routine for diagnostics of the intake air filter.

The first plot, line 702, shows variation in vehicle speed over time. The second plot, line 704, shows a direction of rotation of the engine. The engine may be rotated in a forward, default, direction, for example during engine operation with air fuel combustion in the engine cylinders, the fuel being supplied to the engine cylinders via fuel injectors. Alternatively, the engine may be rotated in a reverse direction, unfueled, such as via an electric machine coupled to the hybrid electric vehicle (HEV) or via the starter motor. The third plot, line 706, shows a direction of rotation of an electric booster (such as electric booster 155 in FIG. 1) coupled to a conduit parallel to the intake manifold downstream of an intake compressor and upstream of a charge air cooler (CAC). The electric booster may be rotated in a forward direction or a reverse direction by reversing a circuit of an actuator coupled to the electric booster, the electric booster powered via an onboard energy storage device. The forward direction of rotation of the electric booster is opposite to the reverse direction of rotation of the electric booster. The fourth plot, line 707, shows operation of the electric machine coupled to the hybrid electric vehicle (HEV). The machine may be operated to provide motor torque to propel the HEV. The fifth plot, line 708, shows an opening of the wastegate valve. During an engine non-combusting condition, the wastegate valve is maintained in a default closed position. The sixth plot, line 710, shows the reading of a MAF sensor (such as MAF sensor 124 in FIG. 1) coupled to the intake manifold. During diagnostics of the wastegate valve, the MAF sensor reading corresponds to the intake airflow. The seventh plot, dashed line 716, shows a flag denoting a diagnostic code set to indicate a degraded exhaust tuning valve.

Prior to time t0, a new (unused) wastegate valve is installed in the wastegate passage of the vehicle at a manufacturing facility. Upon installation of the wastegate valve, between time t0 and t1, when the vehicle is not propelled via engine torque or motor torque, a baseline airflow is estimated. At time t0, the controller sends a signal to the HEV machine to spin the engine unfueled in a reverse direction at a first engine speed. Also, the controller sends a signal to the actuator coupled to the electric booster to rotate the electric booster in a reverse direction at a first electric booster speed. As the engine and the electric booster are rotated in their respective reverse directions, a lower pressure is created at the engine exhaust manifold and ambient air enters the engine system via the exhaust passage. During the engine non-combusting condition, the wastegate valve is maintained in a default closed position. The ambient air then flows through the exhaust turbine, the intake manifold, and is then routed to the atmosphere via the intake passage. Between time t0 and t1, the intake air flow as estimated via the MAF sensor, as shown by dashed line 709, is saved in an on-board database as the baseline air flow corresponding to an unused (not-degraded) wastegate valve. This baseline air flow 709 is later used during diagnostics of the wastegate valve. Since the wastegate valve is not indicated as being degraded, the flag is maintained in an off position.

At time t1, once the baseline air flow is saved in controller memory, the controller sends a signal to each of the HEV machine and the electric booster actuator to suspend operation and to stop rotating the engine and the electric booster, respectively (for the purposes of the diagnostic routine). The time duration between time t1 and t2 corresponds to a threshold duration after which a diagnostic routine for the intake air filter is desired to be carried out opportunistically. The duration between time t1 and t2 includes a plurality of drive cycles and periods of time when the vehicle is not operated (not propelled via engine torque or machine torque).

At time t2, the vehicle starts from rest and is operated via engine torque. The engine is driven by combustion and is rotated in the forward direction. Based on the torque demand, the controller determines a set point pressure for opening the wastegate valve. Based on the higher than set-point exhaust pressure, the wastegate valve is opened to route a portion of the exhaust gas from upstream of the turbine to downstream of the turbine via the wastegate passage. Since the desired boost pressure is met by the turbocharger (exhaust turbine and intake compressor), the electric booster is not operated. The HEV machine is not operated for engine rotation or vehicle propulsion. Between time t2 and t3, the MAF reading denotes the amount of air entering the engine, via the intake passage, for combustion. The amount of air entering the intake passage is proportional to the throttle opening.

At time t3, the vehicle speed reduces to zero and between time t3 and t4, the vehicle is no longer operated using engine torque and/or machine torque (vehicle key-off condition begins). Therefore, at time t3, the engine is shut-down by suspending fuel injection and spark to the engine cylinders. After engine shut-down, as the exhaust pressure reduces to below the set-point pressure, the wastegate valve returns to the default closed position. Between time t3 and t4, the engine is maintained in the off condition.

At time t4, after a threshold duration has elapsed since the vehicle key-off at time t3, diagnostics of the wastegate valve is initiated by waking up the controller. The controller sends a signal to the HEV machine to spin the engine unfueled in a reverse direction at the first engine speed. Also, the controller sends a signal to the actuator coupled to the electric booster to rotate the electric booster in a reverse direction at the first electric booster speed. As the engine and the electric booster are rotated in their respective reverse directions, a lower pressure is created at the engine exhaust manifold and ambient air may enter the engine system via the exhaust passage. The intake throttle is opened to a wide open position to facilitate flow of ambient air through the engine components. Between time t4 and t5 ambient air flows through the exhaust passage, the exhaust turbine, the engine cylinders, and the intake manifold, in that order. The baseline airflow 709, as estimated between time t0 and t1, is retrieved from the on-board database and compared to the intake airflow as estimated based on the MAF reading.

Between time t4 and t5, it is observed that the intake air flow is substantially equal to baseline air flow 709. Therefore, it is inferred that the wastegate valve is in the closed position during the engine non-combusting condition. At time t5, at the end of the diagnostic routine, the controller sends a signal to each of the HEV machine and the electric booster actuator to suspend operation and to stop rotating the engine and the electric booster, respectively. After time t5, the vehicle is not propelled using engine torque and/or machine torque and the engine is maintained in the shut-down condition until a subsequent vehicle key-on. The flag indicating the wastegate valve degradation is maintained in the off state.

However, between time t4 and t5, if the intake airflow would not have been substantially equal to the baseline airflow 709, it would have been inferred that the wastegate valve is degraded and a flag would have been set indicating the degradation of the valve. In one example, if the intake airflow was higher than a first threshold airflow 713 but lower than a second threshold airflow 714, it would have been inferred that the wastegate valve is partially open allowing ambient air to flow from the exhaust passage to the intake manifold via the wastegate passage. As an example, the first threshold airflow 713 is 20% higher than the baseline airflow and the second threshold airflow 714 is 50% higher than the baseline airflow. In another example, if the intake airflow was higher than the second threshold airflow 714, it would have been inferred that the wastegate valve is completely open allowing a higher amount of ambient air to flow from the exhaust passage to the intake manifold via the wastegate passage.

In this way, existing engine components such as the MAF sensor may be repurposed as an intake flow meter for the diagnostics of the wastegate valve. The technical effect of determining a degree of opening of the wastegate valve is that during subsequent engine cycles suitable mitigating actions may be taken to provide a desired boost pressure. Overall, by opportunistically monitoring the health of the wastegate valve, degradation of the valve may be detected in a timely manner and stuck open wastegate valve may be serviced shortly.

An example engine method comprises: testing for degradation of a wastegate valve, positioned in a wastegate passage which is coupled in parallel to a turbine positioned in an exhaust system of an engine, by routing airflow from the exhaust system through the wastegate valve into an intake of the engine and comparing the airflow in the intake to a baseline airflow through the wastegate valve into the engine intake. In any preceding example, additionally or optionally, the routing airflow from the exhaust system through the wastegate is by reverse rotation of the engine to force ambient air into the exhaust system. In any or all of the preceding examples, additionally or optionally, the engine is coupled in a vehicle and the reverse rotation of the engine is carried out at a predetermined set of conditions via a motor powered by a battery under conditions where the vehicle is not in motion. In any or all of the preceding examples, additionally or optionally, the wastegate passage is coupled to an engine exhaust passage from upstream of the turbine to downstream of the turbine, the wastegate valve regulating exhaust flow via the exhaust turbine. In any or all of the preceding examples, additionally or optionally, the wastegate valve is in a default closed position during the testing. In any or all of the preceding examples, the method further comprises, additionally or optionally, during the testing, operating an intake electric booster coupled to the engine intake in a reverse direction to route airflow from the exhaust system to the intake via the wastegate valve. In any or all of the preceding examples, the method further comprises, additionally or optionally, an intake throttle coupled to the engine intake, and wherein the predetermined set of conditions include, an engine speed, a duration of engine cranking, intake throttle position, and speed of rotation of the intake electric booster. In any or all of the preceding examples, additionally or optionally, the airflow in the intake is estimated via a manifold air flow (MAF) sensor coupled to the engine intake, the method further comprising, indicating that the wastegate valve is degraded responsive to the airflow in the intake being higher than the baseline airflow. In any or all of the preceding examples, the method further comprises, additionally or optionally, indicating that the wastegate valve is not degraded responsive to the airflow in the intake being substantially equal to the baseline airflow. In any or all of the preceding examples, additionally or optionally, the baseline airflow is established via the MAF sensor upon installation of the wastegate valve by routing ambient air through the wastegate valve while reverse rotating the engine at the predetermined set of conditions. In any or all of the preceding examples, the method further comprises, additionally or optionally, in response to the indicating that the wastegate valve is degraded, setting a diagnostics code, and during an immediately subsequent engine operation, adjusting operation of the electric booster to compensate for degradation of the wastegate valve.

Another example engine method comprises: during a first engine condition, reverse rotating an engine to route ambient air through one or more of an exhaust turbine positioned in an exhaust of the engine and a wastegate valve positioned in a wastegate passage bypassing the exhaust turbine, and recording a baseline intake airflow, during a second engine condition, reverse rotating the engine to route ambient air through one or more of the exhaust turbine and the wastegate valve, and recording an updated intake airflow, and indicating that the wastegate valve is stuck in an open position in response to the updated intake airflow being higher than the baseline intake airflow. In any preceding example, additionally or optionally, the method further comprises, during each of the first engine condition and the second engine condition, the wastegate valve is actuated to a closed position and a throttle coupled to an engine intake is actuated to a completely open position. In any or all of the preceding examples, additionally or optionally, the first engine condition includes an engine condition when a lower than first threshold duration has elapsed since installation of the wastegate valve, and the second engine condition includes a used engine condition when the wastegate valve has been in use for over a second threshold duration, the second threshold duration longer than the first threshold duration. In any or all of the preceding examples, additionally or optionally, the engine propels a vehicle which comprises an autonomous vehicle and/or a hybrid vehicle, and wherein for both the first operating condition and the second operating condition, the engine is reverse rotated, unfueled, via an electric motor during a vehicle key-off condition. In any or all of the preceding examples, additionally or optionally, each of the baseline intake airflow and the updated intake airflow is estimated via a manifold air flow (MAF) sensor coupled to an engine intake. In any or all of the preceding examples, the method further comprises, additionally or optionally, estimating a degree of opening of the wastegate valve based on a difference between the updated intake airflow and the baseline airflow, the degree of opening increasing with an increase in the difference between the updated intake airflow and the baseline airflow.

In yet another example, a system comprises: a vehicle, including an autonomous vehicle and/or a hybrid vehicle, an electric machine, an engine including an intake passage and an exhaust passage, an intake throttle coupled to the intake passage, a turbocharger including an intake compressor coupled to the intake passage and an exhaust turbine coupled to the exhaust passage, a wastegate passage coupled to the exhaust passage across the exhaust turbine, a wastegate valve coupled to the wastegate passage, a manifold air flow (MAF) sensor coupled to the intake passage, a conduit coupled to the intake passage downstream of the intake compressor and upstream of a charge air cooler, the conduit including a motor-driven electric booster and a controller with computer readable instructions stored on non-transitory memory for: obtaining a baseline airflow via the MAF sensor by reverse rotating the engine with the electric machine when the wastegate valve is first installed, and after usage of the wastegate valve for a threshold duration since the wastegate valve is installed and while the engine is rotated in reverse by the electric machine, obtaining a first intake air flow via the MAF sensor, and responsive to the first intake air flow being higher than the baseline airflow, indicating degradation of the wastegate valve. In any preceding example, additionally or optionally, reverse rotation of the engine is during a vehicle key-off condition. In any or all of the preceding examples, additionally or optionally, the controller includes further instructions for: during a subsequent engine cycle, increasing a speed of rotation of the electric booster in response to the degradation of the wastegate valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    testing for degradation of a wastegate valve, positioned in a wastegate passage which is coupled in parallel to a turbine positioned in an exhaust system of an engine, by routing airflow from the exhaust system through the wastegate valve into an intake of the engine and comparing the airflow in the intake to a baseline airflow through the wastegate valve into the engine intake, wherein the routing of airflow from the exhaust system through the wastegate is by one or more of reverse rotation of the engine and reverse rotation of an electric booster coupled to the engine intake.

2. The method of claim 1, wherein the engine is coupled in a vehicle and the reverse rotation of the engine is carried out at a predetermined set of conditions via a motor powered by a battery under conditions where the vehicle is not in motion.

3. The method of claim 1, wherein the wastegate passage is coupled to an engine exhaust passage from upstream of the turbine to downstream of the turbine, the wastegate valve regulating exhaust flow via the exhaust turbine.

4. The method of claim 1, wherein the wastegate valve is in a default closed position during the testing.

5. The method of claim 1, further comprising, an intake throttle coupled to the engine intake, and wherein the predetermined set of conditions include, an engine speed, a duration of engine cranking, intake throttle position, and speed of rotation of the intake electric booster.

6. The method of claim 1, wherein the airflow in the intake is estimated via a manifold air flow (MAF) sensor coupled to the engine intake, the method further comprising, indicating that the wastegate valve is degraded responsive to the airflow in the intake being higher than the baseline airflow.

7. The method of claim 1, further comprising, indicating that the wastegate valve is not degraded responsive to the airflow in the intake being substantially equal to the baseline airflow.

8. The method of claim 6, wherein the baseline airflow is established via the MAF sensor upon installation of the wastegate valve by routing ambient air through the wastegate valve while reverse rotating the engine at the predetermined set of conditions.

9. The method of claim 6, further comprising, in response to the indicating that the wastegate valve is degraded, setting a diagnostics code, and during an immediately subsequent engine operation, adjusting operation of the electric booster to compensate for degradation of the wastegate valve.

10. An engine method, comprising:
    during a first engine condition, reverse rotating an engine or reverse rotation of an electric booster coupled to an engine intake to route ambient air through one or more of an exhaust turbine positioned in an exhaust of the engine and a wastegate valve positioned in a wastegate passage bypassing the exhaust turbine, and recording a baseline intake airflow;
    during a second engine condition, reverse rotating the engine or reverse rotation of an electric booster coupled to the engine intake to route ambient air through one or more of the exhaust turbine and the wastegate valve, and recording an updated intake airflow; and
    indicating that the wastegate valve is stuck in an open position in response to the updated intake airflow being higher than the baseline intake airflow.

11. The method of claim 10, further comprising, during each of the first engine condition and the second engine condition, the wastegate valve is actuated to a closed position and a throttle coupled to an engine intake is actuated to a completely open position.

12. The method of claim 10, wherein the first engine condition includes an engine condition when a lower than first threshold duration has elapsed since installation of the wastegate valve, and the second engine condition includes a used engine condition when the wastegate valve has been in use for over a second threshold duration, the second threshold duration longer than the first threshold duration.

13. The method of claim 10, wherein the engine propels a vehicle which comprises an autonomous vehicle and/or a hybrid vehicle, and wherein for both the first operating condition and the second operating condition, the engine is reverse rotated, unfueled, via an electric motor during a vehicle key-off condition.

14. The method of claim 10, wherein each of the baseline intake airflow and the updated intake airflow is estimated via a manifold air flow (MAF) sensor coupled to an engine intake.

15. The method of claim 10, further comprising, estimating a degree of opening of the wastegate valve based on a difference between the updated intake airflow and the baseline airflow, the degree of opening increasing with an increase in the difference between the updated intake airflow and the baseline airflow.

16. A system, comprising:
a vehicle, including an autonomous vehicle and/or a hybrid vehicle;
an electric machine;
an engine including an intake passage and an exhaust passage;
an intake throttle coupled to the intake passage;
a turbocharger including an intake compressor coupled to the intake passage and an exhaust turbine coupled to the exhaust passage;
a wastegate passage coupled to the exhaust passage across the exhaust turbine, a wastegate valve coupled to the wastegate passage;
a manifold air flow (MAF) sensor coupled to the intake passage;
a conduit coupled to the intake passage downstream of the intake compressor and upstream of a charge air cooler, the conduit including a motor-driven electric booster; and
a controller with computer readable instructions stored on non-transitory memory for:
obtaining a baseline airflow via the MAF sensor by reverse rotating the engine with the electric machine when the wastegate valve is first installed; and
after usage of the wastegate valve for a threshold duration since the wastegate valve is installed and while the engine is rotated in reverse by the electric machine, obtaining a first intake air flow via the MAF sensor; and
responsive to the first intake air flow being higher than the baseline airflow, indicating degradation of the wastegate valve.

17. The system of claim 16, wherein reverse rotation of the engine is during a vehicle key-off condition.

18. The system of claim 16, wherein the controller includes further instructions for: during a subsequent engine cycle, increasing a speed of rotation of the electric booster in response to the degradation of the wastegate valve.

* * * * *